US012639754B2

(12) United States Patent　　　(10) Patent No.:　US 12,639,754 B2

Gold et al.　　　(45) Date of Patent:　May 26, 2026

(54) TECHNIQUES FOR AUTOMATICALLY CONTROLLING ACCESS TO SECURED RESOURCES

(71) Applicant: EQUIFAX INC., Atlanta, GA (US)

(72) Inventors: Jamie Gold, Sterling, VA (US); Sean McKeown, Atlanta, GA (US); William Gates, Atlanta, GA (US); Ian Wright, Vienna, VA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 18/743,702

(22) Filed: Jun. 14, 2024

(65) Prior Publication Data

US 2024/0420231 A1　　Dec. 19, 2024

Related U.S. Application Data

(60) Provisional application No. 63/508,457, filed on Jun. 15, 2023.

(51) Int. Cl.
　　*G06Q 40/03*　　　(2023.01)
　　*G06Q 30/0201*　　(2023.01)

(52) U.S. Cl.
　　CPC ......... *G06Q 40/03* (2023.01); *G06Q 30/0201* (2013.01)

(58) Field of Classification Search
　　None
　　See application file for complete search history.

(56) References Cited

U.S. PATENT DOCUMENTS

| | | | | |
|---|---|---|---|---|
| 8,306,907 | B2 * | 11/2012 | Das | G06Q 40/03 |
| | | | | 705/38 |
| 8,600,873 | B2 * | 12/2013 | Fisher | G06Q 40/02 |
| | | | | 705/38 |
| 11,210,606 | B1 * | 12/2021 | Morgan | G06N 20/00 |
| 11,580,514 | B1 * | 2/2023 | Whiteley | G06F 3/0482 |
| 2002/0198822 | A1 * | 12/2002 | Munoz | G06Q 40/03 |
| | | | | 705/38 |
| 2005/0209897 | A1 * | 9/2005 | Luhr | G06Q 30/0201 |
| | | | | 705/7.29 |
| 2007/0214077 | A1 * | 9/2007 | Barnes | G06Q 40/03 |
| | | | | 705/38 |

(Continued)

FOREIGN PATENT DOCUMENTS

WO　　　WO-2025101903 A1 *　5/2025　.........　G06F 21/6245

*Primary Examiner* — Ayal I. Sharon

(74) *Attorney, Agent, or Firm* — Kilpatrick Townsend & Stockton LLP

(57)　　　　　ABSTRACT

A system can generate a risk assessment associated with a target entity. The system can determine an attribute tier for each entity in a set of entities. For each attribute tier, the system can: generate a model configured to predict a percent change in the attribute over a time period for each entity in the respective attribute tier; determine the percent change in the attribute for each entity in the respective attribute tier using the model associated with the respective attribute tier; rank each entity in the attribute tier based on the predicted percent change in the attribute; and assign a score to each entity in the attribute tier based on the rank of the respective entity and on a preconfigured distribution. The system can determine a risk indicator based, in part, on the score.

20 Claims, 4 Drawing Sheets

(56)                    References Cited

U.S. PATENT DOCUMENTS

| | | | | |
|---|---|---|---|---|
| 2007/0255645 A1* | 11/2007 | Morris | G06Q 40/08 |
| | | | 705/38 |
| 2014/0019333 A1* | 1/2014 | Morris | G06Q 40/02 |
| | | | 705/38 |
| 2014/0074731 A1* | 3/2014 | Lande | G06Q 10/06395 |
| | | | 705/306 |
| 2019/0272470 A1* | 9/2019 | Bandi | G06F 18/40 |
| 2020/0274894 A1* | 8/2020 | Argoeti | H04L 63/1433 |
| 2022/0101342 A1* | 3/2022 | Mcguckin | G06Q 30/0185 |
| 2022/0319677 A1* | 10/2022 | Johnson | G06F 16/285 |
| 2022/0326997 A1* | 10/2022 | Pradhan | G06F 21/604 |
| 2022/0335348 A1* | 10/2022 | Miller | G06Q 10/0635 |
| 2023/0111785 A1* | 4/2023 | Joshua | G06N 3/0442 |
| | | | 705/38 |
| 2023/0282340 A1* | 9/2023 | Johnson | G06F 16/285 |
| | | | 705/2 |
| 2024/0086923 A1* | 3/2024 | Sarathy | G06F 21/577 |
| 2024/0378604 A1* | 11/2024 | Wanage | G06Q 20/401 |
| 2024/0420231 A1* | 12/2024 | Gold | G06Q 30/0201 |
| 2025/0126311 A1* | 4/2025 | Perelli-Minetti | |
| | | | H04N 21/25891 |
| 2025/0173787 A1* | 5/2025 | Kim | G06Q 50/26 |

* cited by examiner

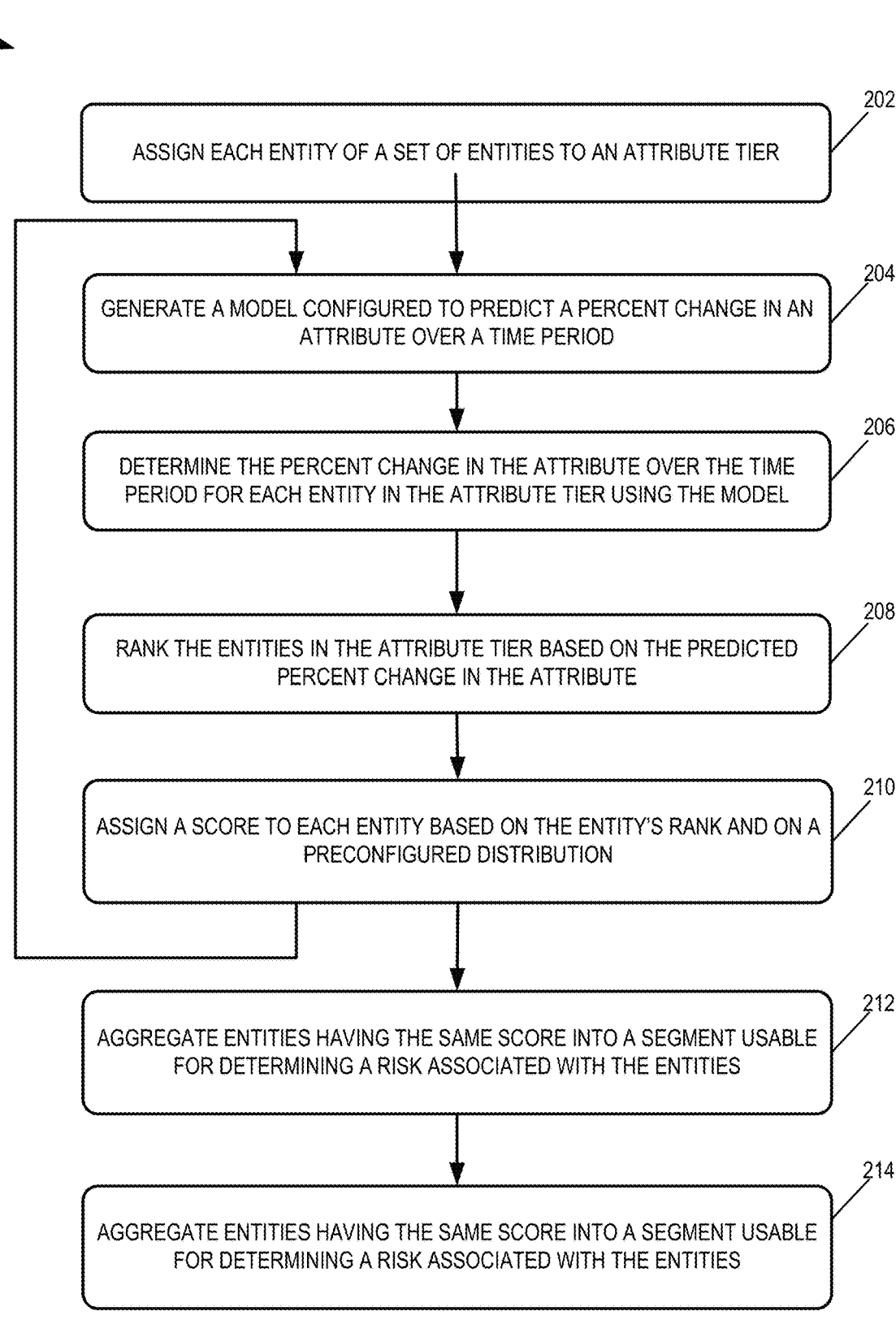

200

202
ASSIGN EACH ENTITY OF A SET OF ENTITIES TO AN ATTRIBUTE TIER

204
GENERATE A MODEL CONFIGURED TO PREDICT A PERCENT CHANGE IN AN ATTRIBUTE OVER A TIME PERIOD

206
DETERMINE THE PERCENT CHANGE IN THE ATTRIBUTE OVER THE TIME PERIOD FOR EACH ENTITY IN THE ATTRIBUTE TIER USING THE MODEL

208
RANK THE ENTITIES IN THE ATTRIBUTE TIER BASED ON THE PREDICTED PERCENT CHANGE IN THE ATTRIBUTE

210
ASSIGN A SCORE TO EACH ENTITY BASED ON THE ENTITY'S RANK AND ON A PRECONFIGURED DISTRIBUTION

212
AGGREGATE ENTITIES HAVING THE SAME SCORE INTO A SEGMENT USABLE FOR DETERMINING A RISK ASSOCIATED WITH THE ENTITIES

214
AGGREGATE ENTITIES HAVING THE SAME SCORE INTO A SEGMENT USABLE FOR DETERMINING A RISK ASSOCIATED WITH THE ENTITIES

RECEIVE A REQUEST FOR A RISK INDICATOR ASSOCIATED WITH A TARGET ENTITY

304

ACCESS ENTITY DATA ASSOCIATED WITH THE TARGET ENTITY

306

DETERMINE A RISK INDICATOR ASSOCIATED WITH THE TARGET ENTITY

308

TRANSMIT, TO A REMOTE COMPUTING DEVICE, A RESPONSIVE MESSAGE INCLUDING THE RISK INDICATOR

TECHNIQUES FOR AUTOMATICALLY CONTROLLING ACCESS TO SECURED RESOURCES

CROSS REFERENCE TO RELATED APPLICATIONS

This application claims priority to U.S. Provisional Application No. 63/508,457 filed Jun. 15, 2023, and entitled "TECHNIQUES FOR AUTOMATICALLY CONTROL-LING ACCESS TO SECURED RESOURCES," the entire contents of which are incorporated herein by reference.

TECHNICAL FIELD

The present disclosure relates generally to controlling interactions between computing systems. More specifically, but not by way of limitation, this disclosure relates to risk assessment based on a predicted rate of change of an attribute associated with a target entity for controlling inter-actions between computing systems.

BACKGROUND

Various systems impose access restrictions on electronic resources to restrict access by unauthorized users. Authen-tication of a target entity may be based on one or more attributes of the target entity. For example, an attribute may be identification information, biometric information, finan-cial information, and geographic information, among others. Some attributes by which a target entity can be verified may change over time. Current systems for providing access to a secured resource may not account for such attribute change, resulting in inefficient access to the secured resource and erroneous denial of a user's access to a secured resource.

SUMMARY

Various aspects of the present disclosure provide systems and methods for risk assessment using a risk indicator. The system can access data associated with a set of entities. For each entity of the set of entities, the system can determine an attribute tier of the respective entity based on a value of an attribute of the entity. The attribute tier can be one of a set of attribute tiers. For each attribute tier, the system can: generate a model configured to predict a percent change in the attribute over a time period for each entity in the respective attribute tier; determine the percent change in the attribute over the time period for each entity in the respective attribute tier using the model associated with the respective attribute tier; rank each entity in the attribute tier based on the predicted percent change in the attribute; and assign a score to each entity in the attribute tier based on the rank of the respective entity and on a preconfigured distribution. The score can be selected from a set of scores. For each score in the set of scores, the system can aggregate entities having the respective score into a segment that can be correlated to a risk associated with the entities in that segment. The system can store, in a database accessible by a remote computing system, the set of entities and associated seg-ments, where the database can be queried by the remote computing system to retrieve a segment for a particular entity for use in determining whether to grant the particular entity access to an interactive computing environment.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 2 is a flow chart illustrating a process for generating a predicted value distribution according to some aspects of the present disclosure.

DETAILED DESCRIPTION OF THE INVENTION

Figure 1:
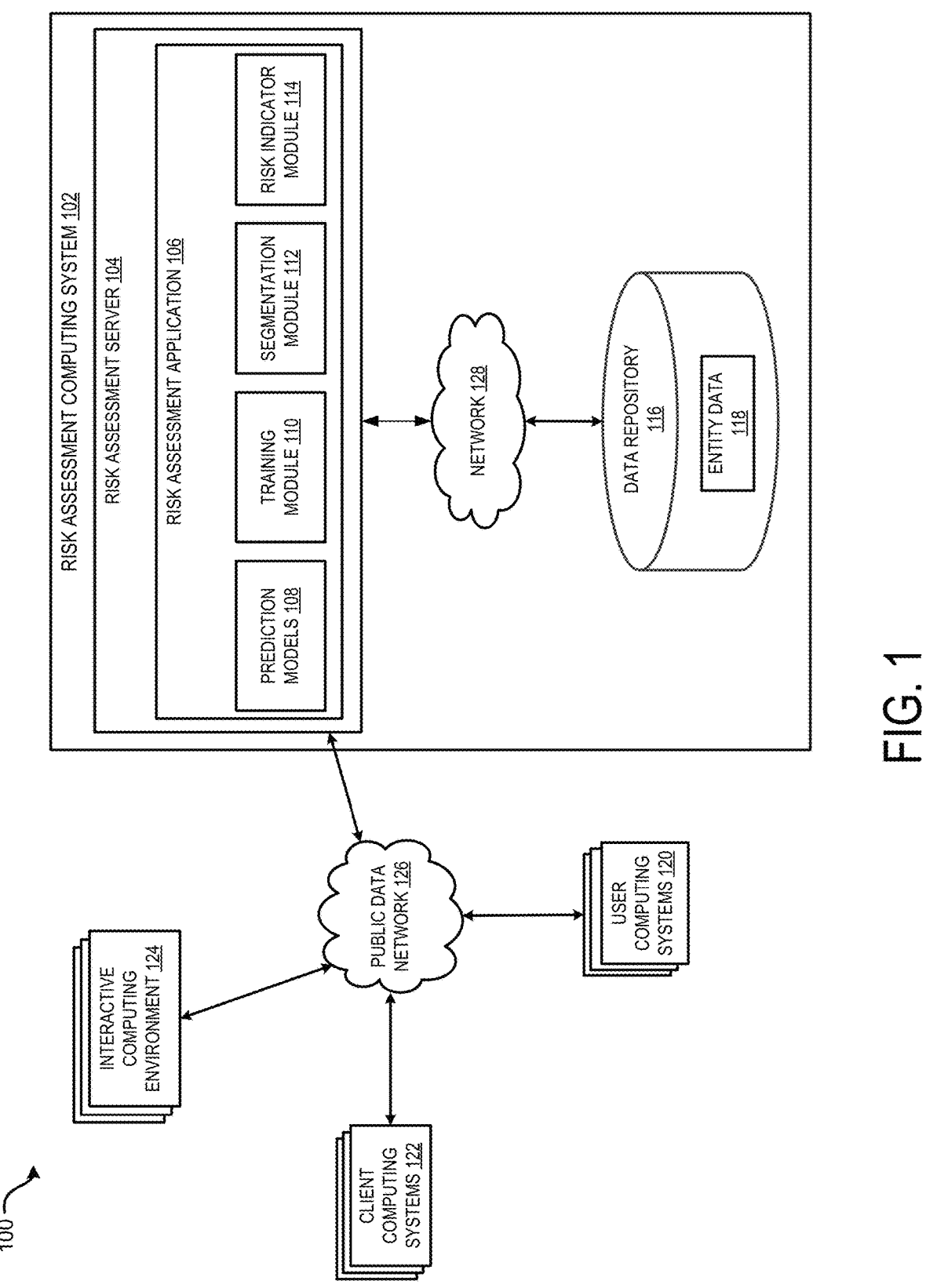
FIG. 1 is a block diagram depicting an example of an operating environment in which a risk assessment comput-ing system can be used to provide a risk assessment asso-ciated with a target entity according to some aspects of the present disclosure.

Disclosed systems and methods relate to risk assessment techniques for controlling access to computing systems risk assessment based on a predicted rate of change of an attribute associated with a target entity. For example, an entity may wish to control access to a secure computer system by a target entity based on a predicted change or predicted rate of change of an attribute associated with a target entity. A risk assessment computing system can retrieve and analyze entity data to generate a risk indicator that is usable by the entity to control access of the target entity to the secure computer system, where the risk indi-cator is based, at least in part, on a predicted percent change in an attribute of a target entity. As an example, an entity may wish to determine access or eligibility to a resource for an individual (e.g., a target entity) based on a predicted potential for change in the individual's position with respect to one or more attributes or variables. Controlling access to computing systems, such as providing access to a secure resource or computing environment, is important to the security of such resources and computing environments. Interactions and access can be controlled based on risk assessments using data indicative of a future value of an attribute associated with a target entity, or a potential future value of an attribute associated with the target entity. For example, a target entity can be associated with a present value of an attribute, such as an amount of liquid assets held by the target entity. Disclosed systems and methods can be used to develop a model to predict a future value of the attribute based on a subset of entities having attribute values that fall within a particular attribute tier. Accordingly, by developing separate models for different attribute tiers, each model can account for latent behavioral differences between entities in each attribute tier.

Certain aspects described herein for performing risk assessments on target entities using data associated with the target entities can improve existing systems by dynamically generating a set of independent models that can make predictions for target entities, while accounting for differing entity behaviors. Generating a risk indicator (e.g., a score indicating a degree of risk associated with allowing a target entity to access a computing environment) associated with the target entity based on a predicted attribute value can improve the efficiency and accuracy of, for example, credit check operations. In some examples, the risk indicator can be a numerical or binary indicator of a level of risk associated with the target entity. In other aspects, the risk indicator can indicate a lack of risk associated with a target entity. In other examples, disclosed systems can provide a report including segmented and analyzed entity data to the requesting system. The requesting system can then perform independent analysis on the report to determine whether to grant access to the target entity.

In some examples, a risk assessment computing system can receive a request for a risk indicator associated with a target entity. The request can include an identifier associated with the target entity. The identifier can be used to retrieve data associated with the target entity from a database. In other examples, target entity data can be received from the requesting system, or from the user, via an interface.

The risk assessment computing system can determine an attribute tier for the target entity based on a value of an attribute of the target entity. In some examples, the attribute tier can be determined based on a set of variables associated with or correlated with the attribute. The attribute tier can be a tier of a set of tiers and can be associated with a certain range of attribute values. In some examples, the range of each attribute tier is determined based on an attribute distribution. The distribution can be, for example, a distribution of observed attribute values in a sample representative of a population. The risk assessment system can then retrieve an attribute tier model from a model database for the attribute tier to which the target entity belongs.

In some aspects, the attribute tier model can be generated based on the entity data associated with entities belonging to the attribute tier. Thus, the generated attribute tier models account for differences in behaviors and trends occurring between entities belonging to different attribute tiers. An attribute tier model can be, for example, a machine learning model trained on the entity data associated with entities in the attribute tier. In another example, linear regression can be applied to the entity data in the attribute tier to generate the model. For example, the risk assessment computing system can determine a degree of correlation between each variable of a set of variables and the attribute associated with the respective attribute tier. The risk assessment computing system can select a subset of variables having a degree of correlation above a correlation threshold and can generate the model for the respective attribute tier by fitting a linear regression model to entity data associated with the subset of variables.

Once the model for a particular attribute tier has been generated, the model can be used to determine a predicted value of an attribute. For example, the corresponding attribute tier model can be applied to data associated with the target entity. The model can predict a future value of the attribute for the target entity. Based on the future value, a score can be assigned to the target entity. The score can be, for example, an integer value selected from a range (e.g., one to five). The correlation between the score and predicted value can be based on an observed or estimated distribution of future values. In another example, the distribution can be a Gaussian distribution.

The score can be used, for example, to assign the target entity to a particular segment associated with a predefined outcome or risk level. In another example, a risk indicator can be determined based on the score for the target entity. In some examples, a decision on whether to allow access to the target entity to a resource can be based on the score being higher or lower than a predetermined threshold.

The risk assessment computing system can transmit the risk indicator to a remote computing system. In some examples, this may be the system from which the risk indicator was requested. The risk indicator can be used to control access of the target entity to an interactive computing environment. In an example, the risk indicator can be included in a responsive message to the request for evaluating the target entity such that the responsive message can be used to allow, challenge, or deny access to the target entity. For example, if the risk indicator is below a predefined threshold, a request by the target entity to access the interactive computing environment may be automatically denied or flagged for manual review. In some examples, the risk assessment computing system may also generate and transmit to the remote computing system, a report with one or more data visualization elements that illustrate the distribution of scores and statistics associated with the target entity.

Certain aspects described herein, which can include dynamically predicting attribute values associated with target entities based on an attribute tier of the target entity and providing a responsive message indicating a risk associated with the target entity, can improve at least the technical fields of controlling interactions between computing environments, access control for a computing environment, or a combination thereof. For instance, by generating and transmitting the responsive message, the risk assessment computing system can cause access to a computing system to be controlled more accurately, as the risk indicator is based on a score determined by a unique model associated with a particular population segment or attribute tier. Disclosed systems and methods can also be used to generate and maintain a scoring or segmentation database that can be quickly queried to retrieve a score or segment for a particular target entity. The responsive message can include the attribute tier ranges and the score distributions. Additionally or alternatively, by using the techniques described herein, a risk assessment computing system may provide legitimate access to the interactive computing environment more efficiently and using fewer computing resources compared to other risk assessment systems or techniques. For example, the risk assessment computing system can determine a risk indicator or an actionable response message efficiently thereby reducing the (i) memory usage, (ii) processing time, (iii) network bandwidth usage, (iv) response time, and the like for controlling access to the interactive computing. Accordingly, the risk assessment computing system improves the access control for computing environment by reducing memory usage, processing time, network bandwidth consumption, response time, and the like with respect to controlling access to the interactive computing environment using at least the system architecture and techniques described herein.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Generating a Risk Indicator Associated with a Target Entity Referring now to the drawings, FIG. 1 is a block diagram depicting an example of an operating environment in which a risk assessment computing system can be used to provide a risk assessment associated with a target entity according to some aspects of the present disclosure. FIG. 1 depicts examples of hardware components of a risk assessment computing system 102, according to some aspects. The risk assessment computing system 102 can be a specialized computing system that may be used for processing large amounts of data using a large number of computer processing cycles. In other examples, the risk assessment computing system 102 may be or include a general-purpose computing system. The risk assessment computing system 102 can include a risk assessment server 104 for performing a risk assessment (e.g., predicting future risk associated with the target entity, predicting the legitimacy of the target entity, etc.) with respect to a target entity, such as a target individual or a user computing device. The risk assessment can be based on a predicted future attribute value based on a model associated with an attribute tier of the target entity and can be used by a client computing system 122 to evaluate a risk associated with a target entity.

The risk assessment server 104 can include one or more processing devices that can execute program code, such as a risk assessment application 106. The program code can be stored on a non-transitory computer-readable medium or other suitable medium. The risk assessment application 106 can include one or more modules or components executing software code to complete one or more steps for determining a risk indicator. For example, the risk assessment application 106 can include: prediction models 108; a training module 110; and a segmentation module 112. The training module 110 can train each of a set of prediction models 108 using entity data 118 stored in the data repository 116. Each model of the prediction models 108 can be assigned to an attribute tier and trained using entity data associated with entities for which the attribute has the particular value. The segmentation module 112 can apply entity data from the data repository 116 to predict, using the trained prediction models 108, a future attribute value for a set of entities. The segmentation module 112 can determine, based on a distribution, a score for each entity of the set of entities. In some examples, the entities can be further aggregated into segments based on the scores. In some aspects, the risk indicator module 114 can determine, based on a target entity's score or segment, a risk indicator for the target entity. The risk indicator can be used to control access of the target entity to a resource or system.

The risk assessment server 104 can perform risk assessment operations or access control operations for validating or otherwise authenticating the target entity, for example using other suitable modules, models, components, etc. of the risk assessment server 104. The risk assessment server 104 can receive data associated with the target entity from data repository 116, or any suitable combination thereof. In some aspects, the risk assessment application 106 can authenticate or deny a request for an interaction involving the target entity by generating a risk indicator using the target entity data retrieved from the external data sources 116 and the data repository 116.

In some aspects, the target entity data can be determined or stored in one or more network-attached storage units on which various repositories, databases, or other structures are stored. An example of these data structures can include the data repository 116. Additionally or alternatively, entity data 120 can be stored in the data repository 116. In some examples, the entity data 120 can be associated with a number of entities and can be searchable using identifying information associated with each entity. For example, the entity data 120 can be searched using personally identifiable information (PII) associated with an individual, or a serial number associated with a system component.

Network-attached storage units may store a variety of different types of data organized in a variety of different ways and from a variety of different sources. For example, the network-attached storage unit may include storage other than primary storage located within the risk assessment server 104 that is directly accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory devices, or other suitable media.

Furthermore, the risk assessment computing system 102 can communicate with various other computing systems. The other computing systems can include user computing systems 120, such as smartphones, personal computers, etc., client computing systems 122, and other suitable computing systems. For example, user computing systems 120 may transmit, such as in response to receiving input from the target entity, requests for accessing the interactive computing environment 124 to the client computing systems 122. In response, the client computing systems 122 can send authentication queries to the risk assessment server 104, and the risk assessment server 104 can receive data associated with the target entity used in the request and generate a risk indicator associated with the target entity. While FIG. 1 illustrates that the risk assessment computing system 102 and the client computing systems 122 are separate systems, the risk assessment computing system 102 and the client computing systems 122 can be one system. For example, the risk assessment computing system 102 can be a part of the client computing systems 122, or vice versa.

As illustrated in FIG. 1, the risk assessment computing system 102 may interact with the client computing systems 122, the user computing systems 120, or a combination thereof via one or more public data networks 126 to facilitate interactions between users of the user computing systems 120 and the interactive computing environment 124. For example, the risk assessment computing system 102 can facilitate the client computing systems 122 providing a user interface to the user computing system 120 for receiving various data from the user. The risk assessment computing system 102 can transmit validated risk assessment data, for example similarity-preserving hashes, comparisons or scores determined therefrom, etc., to the client computing systems 122 for providing, challenging, or rejecting, etc. access of the target entity to the interactive computing environment 124. In some examples, the risk assessment computing system 102 can additionally communicate with third-party systems to receive risk assessment data, entity data, and the like, through the public data network 126. In some examples, the third-party systems can provide real-time (e.g., streamed) data about the target entity, historical data about the target entity, etc. to the risk assessment computing system 102.

Each client computing system 122 may include one or more devices such as individual servers or groups of servers operating in a distributed manner. A client computing system 122 can include any computing device or group of computing devices operated by a seller, lender, or other suitable entity that can provide products or services. The client computing system 122 can include one or more server devices. The one or more server devices can include or can otherwise access one or more non-transitory computer-readable media.

The client computing system 122 can further include one or more processing devices that can be capable of providing an interactive computing environment 124, such as a user interface, etc., that can perform various operations. The interactive computing environment 124 can include executable instructions stored in one or more non-transitory computer-readable media. The instructions providing the interactive computing environment 124 can configure one or more processing devices to perform the various operations. In some aspects, the executable instructions for the interactive computing environment 124 can include instructions that provide one or more graphical interfaces. The graphical interfaces can be used by a user computing system 120 to access various functions of the interactive computing environment 124. For instance, the interactive computing environment 124 may transmit data to and receive data, such as via the graphical interface, from a user computing system 120 to shift between different states of the interactive computing environment 124, where the different states allow one or more electronic interactions between the user computing system 120 and the client computing system 122 to be performed.

In some examples, the client computing system 122 may include other computing resources associated therewith (e.g., not shown in FIG. 1), such as server computers hosting and managing virtual machine instances for providing cloud computing services, server computers hosting and managing online storage resources for users, server computers for providing database services, and others. The interaction between the user computing system 120, the client computing system 122, and the risk assessment computing system 102, or any suitable sub-combination thereof may be performed through graphical user interfaces, such as the user interface, presented by the risk assessment computing system 102, the client computing system 122, other suitable computing systems of the computing environment 100, or any suitable combination thereof. The graphical user interfaces can be presented to the user computing system 120. Application programming interface (API) calls, web service calls, or other suitable techniques can be used to facilitate interaction between any suitable combination or sub-combination of the client computing system 122, the user computing system 120, and the risk assessment computing system 102.

A user computing system 120 can include any computing device or other communication device that can be operated by a user or entity, such as the user entity, which may include a consumer or a customer. The user computing system 120 can include one or more computing devices such as laptops, smartphones, and other personal computing devices. A user computing system 120 can include executable instructions stored in one or more non-transitory computer-readable media. The user computing system 120 can additionally include one or more processing devices configured to execute program code to perform various operations. In various examples, the user computing system 120 can allow a user to access certain online services or other suitable products, services, or computing resources from a target entity, such as the client computing system 122, to engage in mobile commerce with the client computing system 122, to obtain controlled access to electronic content, such as the interactive computing environment 14, hosted by the client computing system 122, etc.

In some examples, the user or a target entity can use the user computing system 120 to engage in an electronic interaction with the client computing system 122 via the interactive computing environment 124. The risk assessment computing system 102 can receive a request, for example from the user computing system 120, to access the interactive computing environment 124 and can use target entity data or any other suitable data or signals determined therefrom, to determine whether to provide access, to challenge the request, to deny the request, etc. An electronic interaction between the user computing system 120 and the client computing system 122 can include, for example, the user computing system 120 being used to request a services or products from the client computing system 122, and so on. An electronic interaction between the user computing system 120 and the client computing system 122 can also include, for example, one or more queries for a set of sensitive or otherwise controlled data, accessing online services provided via the interactive computing environment 124, submitting an online credit card application or other digital application to the client computing system 122 via the interactive computing environment 124, operating an electronic tool within the interactive computing environment 124 (e.g., a content-modification feature, an application-processing feature, etc.), etc.

In some aspects, an interactive computing environment 124 implemented through the client computing system 122 can be used to provide access to various online functions. As a simplified example, a user interface or other interactive computing environment 124 provided by the client computing system 122 can include electronic functions for requesting computing resources, online storage resources, network resources, database resources, or other types of resources. In another example, a website or other interactive computing environment 124 provided by the client computing system 122 can include electronic functions for obtaining one or more financial services, such as an asset report, management tools, credit card application and transaction management workflows, electronic fund transfers, etc.

A user computing system 120 can be used to request access to the interactive computing environment 124 provided by the client computing system 122. The client computing system 122 can submit a request, such as in response to a request made by the user computing system 120 to access the interactive computing environment 124, for risk assessment to the risk assessment computing system 102 and can selectively grant or deny access to various electronic functions based on risk assessment performed by the risk assessment computing system 102. Based on the request, or continuously or substantially contemporaneously, the risk assessment computing system 102 can determine one or more risk signals or risk indicators for data associated with the target entity, which may submit or may have submitted the request via the user computing system 120. The risk indicator can be based on a score associated with a future attribute value predicted by a model associated with an attribute tier of the target entity. Based on the risk indicator, the risk assessment computing system 102, the client computing system 122, or a combination thereof can determine whether to grant the access request of the user computing system 120 to certain features of the interactive computing environment 124. The risk assessment computing system 102, the client computing system 122, or a combination thereof can use the risk indicator for other suitable purposes such as identifying a manipulated identity, controlling a real-world interaction, and the like.

In a simplified example, the system illustrated in FIG. 1 can configure the risk assessment server 104 to be used for controlling access to the interactive computing environment 124. The risk assessment server 104 can retrieve data associated with the target entity in response to a request to access the interactive computing environment 124. The data may, for example, be retrieved based on identity information (e.g., information collected by the client computing system 122 via a user interface provided to the user computing system 120) provided by the client computing system 122 or received via other suitable computing systems. The risk assessment server 104 can retrieve the data associated with the target entity from one or more data sources, such as the data repository 116, or from external data sources. The data repository 116 can store, for example, financial, demographic, or transaction data associated with one or more entities. The risk assessment server 104 can determine a risk indicator associated with the target entity based on analysis of the future attribute value predicted by one of the prediction models 108. The risk assessment server 104 can transmit the risk indicator, or any inference derived therefrom, to the client computing system 122 for use in controlling access to the interactive computing environment 124.

The risk indicator associated with the target entity, or any suitable score or comparison determined therefrom, can be used, for example by the risk assessment computing system 102, the client computing system 122, etc., to determine whether the risk associated with the target entity accessing a good or a service provided by the client computing system 122 using exceeds a threshold, thereby granting, challenging, or denying access by the target entity to the interactive computing environment 124. For example, if the risk assessment computing system 102 determines that the risk indicator indicates that risk associated with the identity element is lower than a threshold value, then the client computing system 122 associated with the service provider can generate or otherwise provide access permission to the user computing system 120 that requested the access. The access permission can include, for example, cryptographic keys used to generate valid access credentials or decryption keys used to decrypt access credentials. The client computing system 122 can also allocate resources to the target entity and provide a dedicated web address for the allocated resources to the user computing system 120, for example, by adding the user computing system 120 in the access permission. With the obtained access credentials or the dedicated web address, the user computing system 120 can establish a secure network connection to the interactive computing environment 124 hosted by the client computing system 124 and access the resources via invoking API calls, web service calls, HTTP requests, other suitable mechanisms or techniques, etc.

In some examples, the risk assessment computing system 102 may determine whether to grant, challenge, or deny the access request made by the user computing system 120 for accessing the interactive computing environment 124. For example, based on the risk indicator associated with the target entity, the risk assessment computing system 102 can determine that the target entity is a legitimate entity that made the access request and may authenticate the request. In other examples, the risk assessment computing system 102 can challenge or deny the access attempt if the risk assessment computing system 102 determines that the target entity may not be a legitimate entity.

Each communication within the computing environment 100 may occur over one or more data networks, such as a public data network 126, a network 128 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices illustrated in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate may be instead implemented in a signal device or system.

Process for Generating a Predicted Attribute Distribution

FIG. 2 is a block diagram depicting an example process 200 for generating a predicted attribute distribution according to some aspects of the present disclosure. The process 200 can be implemented by any of the components as described above with reference to FIG. 1. For example, the blocks described with respect to FIG. 2 can be executed by the risk assessment server 102 via one or both of public network 126 and network 128. Other implementations or architectures, however, are possible.

At block 202, the process 200 can include assigning each entity of a set of entities to an attribute tier of a set of attribute tiers. An entity can be assigned to an attribute tier based on an attribute value being within a range defined by a particular attribute tier. The ranges of values for each attribute tier can be configured such that a predetermined percentage of the set of entities falls within a particular attribute tier (e.g., according to a distribution). In some examples, the entity data can be retrieved from the data repository 116. In other examples, the entity data can be received via the user computing device 118 via an interface (e.g., as part of a credit card application). In another example, data input by the user can be used to supplement the entity data 120 stored in the data repository 116.

At block 204, the process 200 can include generating a model configured to predict a percent change in an attribute associated with an attribute tier. Generating the model can include training a model of the prediction models 108 using entity data 118. In another example, a linear regression model can be fit to the entity data of the attribute tier to estimate each entity's percent change in the attribute for a particular time period. For example, the risk assessment computing system can determine a degree of correlation between each variable of a set of variables and the attribute associated with the respective attribute tier. The risk assessment computing system can select a subset of variables having a degree of correlation above a correlation threshold and can generate the model for the respective attribute tier by fitting a linear regression model to entity data associated with the subset of variables. Other model generation methods can be used to determine a model for the attribute tier based on entity data for entities within that attribute tier.

At block 206, the process 200 can include determining the percent change in the attribute over the time period for each entity in the attribute tier. For example, for each entity in the attribute tier, the model generated at block 204 can be used to predict a percent change in the attribute for the entity based on data associated with that entity. In some examples, the model for the attribute tier can be used to predict a future value of the attribute for each entity in the attribute tier.

At block 208, the process 200 can include ranking the entities in the attribute tier based on the predicted percent change in the attribute over the period of time. For example, the entities can be ranked from greatest to least percent change in the value of the attribute.

At block 210, the process 200 can include assigning a score to each entity in the attribute tier based on the entity's rank and on a preconfigured distribution. A score can be, for example, a rating on a scale (e.g., A through D), or an integer in a range (e.g., one to five). The preconfigured distribution can define a number of entities from the set of entities in the attribute tier or a percentage of the entities from the set of entities in the attribute tier that should be assigned each score. As an example, if the scores range from one to five, a Gaussian distribution may be used to determine a number of entities that should be assigned each score to achieve a Gaussian distribution of scores. Accordingly, the scores can then be assigned such that the top x percent of entities have the highest score, the next y percent of entities have the second highest score, and so on.

Blocks 204 through 210 can be repeated for each attribute tier of the set of attribute tiers. For the number of attribute tiers, an equal number of models are generated by the computing system to account for differences in behavior between entities in different attribute tiers. This enables the risk assessment computing system 102 to account for the fact that entities in different attribute tiers may be impacted by different factors and to different degrees. Thus, the model for predicting the percent rate of change of the attribute of entities associated with high-value attributes may be different from the model for predicting percent rate of change of the attribute of entities associated with low-value attributes.

At block 212, the process 200 can include aggregating entities across attribute tiers having the same score into a segment. For example, after block 210 is completed for each attribute tier, there will be a set of entities in a first attribute tier having a particular score, a set of entities in a second attribute tier having the particular score, a set of entities in a third attribute tier having the particular score, and so on. These entities can be aggregated into a segment associated with the particular score. Thus, entities having the same potential for attribute change over the time period are grouped into a segment. The particular segment can be assigned, in some examples, a risk and can be used, in part, to determine a risk indicator for a target entity.

In some aspects, at block 214, the process 200 can include storing, in a database accessible by a remote computing system (e.g., the client computing system 122), the set of entities and associated segments. For example, the database can be queried by the client computing system 122 to retrieve a segment for a particular entity for use in determining whether to grant the particular entity access to an interactive computing environment. In another example, the client computing system 122 can submit a request to the risk assessment computing system 102 to retrieve, from the database, the segment associated with a target entity. The client computing system 122 can then use the segment of the target entity as an input in a risk determination or an access determination with respect to the target entity.

In an illustrative, but non-limiting example, disclosed systems and methods can be used to overcome biases in offering products and services to households. For example, the use of metrics such as household income or liquid assets held can be biased towards households having an established level of wealth and do not necessarily reflect that household's future financial position. In this example, let each entity be a household and the attribute be a level of wealth. The level of wealth can be an attribute defined by one or more variables such as income level or amount of liquid assets.

For a set of entities, the risk assessment computing system 102 can receive entity data 118, which can include credit data, household financial data, property data, and the like. In some examples, at least a portion of the entity data 118 can be proprietary to the risk assessment computing system 102. The entity data 118 can be used to determine a number of metrics, or attributes, associated with each entity. Exemplary attributes can be a wealth level of an entity, an amount of liquid assets held by an entity, or a wealth level of a set of entities associated with a micro-group (e.g., a disambiguated grouping of entities having similar characteristics). A micro-group can maintain anonymity of the entities in the micro-group by aggregating data for a minimum number of entities within the micro-group (e.g., seven entities, ten entities, etc.). The number of entities can be based on a minimum number of entities required to maintain anonymity of the entities in the micro-group. In some examples, the micro-groups can be determined using clustering techniques to cluster similar entities. In other examples, micro-groups can represent entities within a predefined geographical area or radius.

As an example, an attribute, or target attribute, can be a level of wealth. The risk assessment computing system 102 can determine a number of attribute tiers to represent the distribution of the attribute across a population. The distribution can be determined, for example, from the average distribution of total assets per household in the United States, or another such metric. In another example, the number of attribute tiers can be tuned based on analysis of a degree of similarity between entities within the attribute tier. For example, clustering analysis can be performed on the set of entities to determine similar clusters, which can be used to define the range of each attribute tier.

For each attribute tier, the risk assessment computing system 102 can generate a model to predict an attribute growth rate (e.g., a wealth growth rate based on the current level of wealth of a household) for each entity in the attribute tier. That is, for each attribute tier, a linear regression model may be fit with the objective of estimating the entities' percent change in assets over a period of time (e.g., percent change in the attribute value). In another example, the model for each attribute tier can be a machine learning model trained on entity data associated with entities belonging to the attribute tier. For the number of attribute tiers, an equal number of models are generated by the risk assessment computing system 102 to account for differences in behavior between entities in different attribute tiers. In this example, this enables the risk assessment computing system 102 to account for the fact that households in different wealth tiers may be impacted by different factors and to different degrees. Thus, the model for predicting the wealth growth rate (e.g., the percent change of the attribute value) of high-wealth households (e.g., entities in a higher value attribute tier) may be different from the model for predicting the wealth growth rate of low-wealth households and may be generated based on different factors.

Once the models for each attribute tier are generated, the models can be applied to entities in the respective attribute tiers. For example, in one attribute tier, the associated model can be applied to data associated with each entity in the attribute tier to determine an attribute growth rate for each entity in the attribute tier. The risk assessment computing system 102 can then sort the entities in the attribute tier from greatest to least attribute growth rate. Once the entities of the attribute tier are ranked based on their associated attribute growth rates, the risk assessment computing system 102 may assign each entity a score. The score may be an integer value selected from a range, e.g., one through five. The distribution of scores assigned to the entities in the attribute tier may be based on a probability distribution, e.g., a normal distribution or a Gaussian distribution. For example, a distribution for the scores may be determined such that the top five percent of entities (i.e., the five percent of households having the greatest predicted wealth growth rates) are assigned the highest score.

The above blocks are repeated with each attribute tier, such that entities within each attribute tier are ranked and scored based on their predicted attribute growth rates as determined by the respective model associated with the attribute tier. Once all entities across attribute tiers are scored, they may be sorted into segments where each segment corresponds to a score. Accordingly, a household on the lower end of the wealth spectrum (e.g., less than $10,000 total assets) has roughly the same likelihood of being assigned to the same segment as a household on the higher end of the wealth spectrum (e.g., greater than $1 million total assets). Accordingly, the household or user associated with the household may be granted access to a resource of a system based on an attribute that varies in value over time, e.g., a predicted future level of wealth or a predicted rate of change in their wealth.

In some examples, the segmentation module 112 may then segment the ranked list of entities according to a predetermined distribution, where each segment is associated with a score. The score may be an integer value (e.g., one through five) such that: segment one includes entities with flat to minimal expected growth in assets; segment two includes entities with below-average growth in assets; segment three includes entities with slightly above-average growth in assets; segment four includes entities with above-average growth in assets; and segment five includes entities with the highest relative growth in assets. Accordingly, entities from different attribute tiers may fall into the same segment, meaning they have similar predicted growth in assets. In some examples, one or more segments may also be associated with declining wealth growth rates, i.e., where an entity's assets are expected to decrease over a period of time.

In some aspects, the risk assessment computing system 102 may provide the segmented entity data and scores to a client computing system 122. The client computing system 122 may use this information to automatically or manually determine eligibility of the entities for financial services, such as wealth management services, or for preferred or premium service levels. For example, a household may be a current customer of a wealth management service at a general or base service level (i.e., a service level offered to all customers). The client computing system 122 may determine that a household has a particular threshold wealth growth rate (e.g., attribute growth rate) and, thus, may be eligible for the opportunity to be offered a premium level of wealth management services.

The above-described example has a number of advantages in granting access to a resource based on a time-dependent attribute, for example, it enables a service provider to cater to a customer base that is diverse in terms of their current wealth. Further, the determined score for a household or entity may enable service providers to: enhance prospecting with insight on future potential asset growth; prioritize customers for varying service levels based on expected asset growth; assess book of business for hidden future opportunities; differentiate customers for offers; allocate leads with an indication of possible future value; and enhance currently employed models.

Although the above example is described with respect to a household's financial position and expected wealth growth, disclosed systems and methods can be used to predict change in other time-dependent attributes. For example, an entity can be a computing system. A time-dependent attribute can be an amount of available data storage. The risk assessment computing system 102 can determine a future capacity of the computing system where systems having greater computing or storage capabilities behave differently than those having fewer computing or storage capabilities, and thus can be sorted into different attribute tiers where future capacity is determined by different models based on the relative behavior of the systems in each attribute tier.

Techniques for Generating a Risk Indicator Associated with a Target Entity

Figure 3:
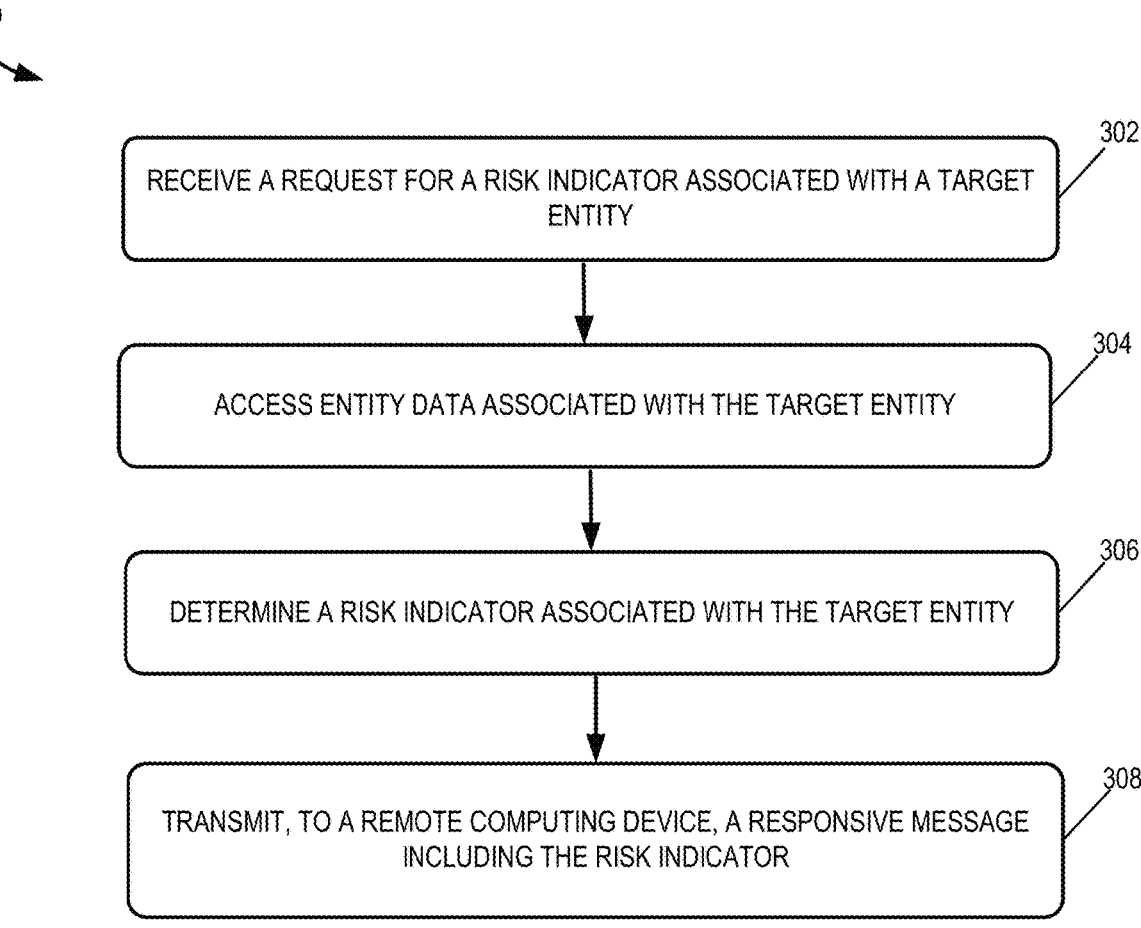
FIG. 3 is a flow chart illustrating a process for generating a risk assessment associated with a target entity according to some aspects of the present disclosure.

FIG. 3 is a flow chart illustrating an example of a process 300 for generating a risk assessment associated with a target entity according to some aspects of the present disclosure. In some examples, the operations of the process 300, or any subset thereof, may be performed by the risk assessment computing system 102 via the risk assessment server 104, but other suitable systems, devices, or subsets or combinations thereof may perform one or more operations described with respect to the process 300. For illustrative purposes, the process 300 is described with reference to certain examples depicted in the figures. Other implementations, however, are possible.

At block 302, the process 300 involves receiving a request for a risk indicator associated with a target entity. The request can include an identifier associated with the target entity. The identifier can be, for example, PII such as an SSN, or a combination of PII such as a name and DOB, or can be a unique identifier, such as a serial number. The request may be generated as part of an authentication process initiated when the target entity attempts to access an interactive computing environment 124.

At block 304, the process 300 involves accessing entity data associated with the target entity. The entity data can be, for example, data stored in the data repository 116. In addition, or in the alternative, entity data can be received from a user via the user computing system 120. For example, a user can input data via a GUI displayed on the user computing system 120 and provided by the client computing system 122.

At block 306, the process 300 involves determining a risk indicator associated with the target entity. Several methods for determining the risk indicator can be used. For example, at a previous time, the risk assessment computing system 102 can execute the process 200 as described with respect to FIG. 2. The resulting entity scores can be stored to the data repository 116 such that the risk assessment computing system 102 can receive a request for a risk indicator and query the data repository to retrieve the score associated with the target entity. In another example, the score can be determined when the request is received. The risk assessment computing system 102 can determine, based on the target entity data, an attribute tier for the target entity and apply the model associated with the target entity tier to the target entity data to determine the predicted change in the attribute value for the target entity. The predicted change can then be used to insert the target entity into the ranked set of entities in the attribute tier to determine the score for the target entity.

Once the score is determined for the target entity, the risk assessment computing system 102 can determine the risk indicator for the target entity. In some examples, the risk indicator may map to each score or each scoring segment. In another example, the score can be an input to an algorithm for determining the risk indicator. For example, the score can be one factor in determining the risk indicator in addition to other features of the target entity data.

At block 308, the process 300 involves transmitting, to a remote computing device (e.g., the client computing device 122), a responsive message comprising at least the risk indicator for use in controlling access of the target entity to one or more interactive computing environments. For example, the risk indicator can be used in controlling an interaction involving a target entity or access of the target entity to a restricted system (e.g., the interactive computing environment 124). In another example, the risk indicator can be used to control the target entity's eligibility for a product, such as a loan or credit card. In another example, the risk indicator can be used in determining a level of access or a level of service offered or provided to the target entity.

Systems and methods described herein provide advantages over traditional risk assessment systems that do not account for differences in entity behavior based on attribute values. For example, described systems and methods can provide results more efficiently by determining a potential growth segment into which a target entity falls that can be immediately retrieved upon request for use in determining a risk indicator. Further, disclosed systems and methods account for differences in the behavior of entities having different attribute values. Thus, bias against entities having different current attribute values can be reduced or eliminated by predicting future growth of attributes in a manner that is tailored to the behavior of entities at different attribute levels. In addition to reducing or eliminating bias, the risk assessment system 102 can generate a more accurate and dependable risk indicator from the scores determined for each entity.

Example of Computing System

Figure 4:
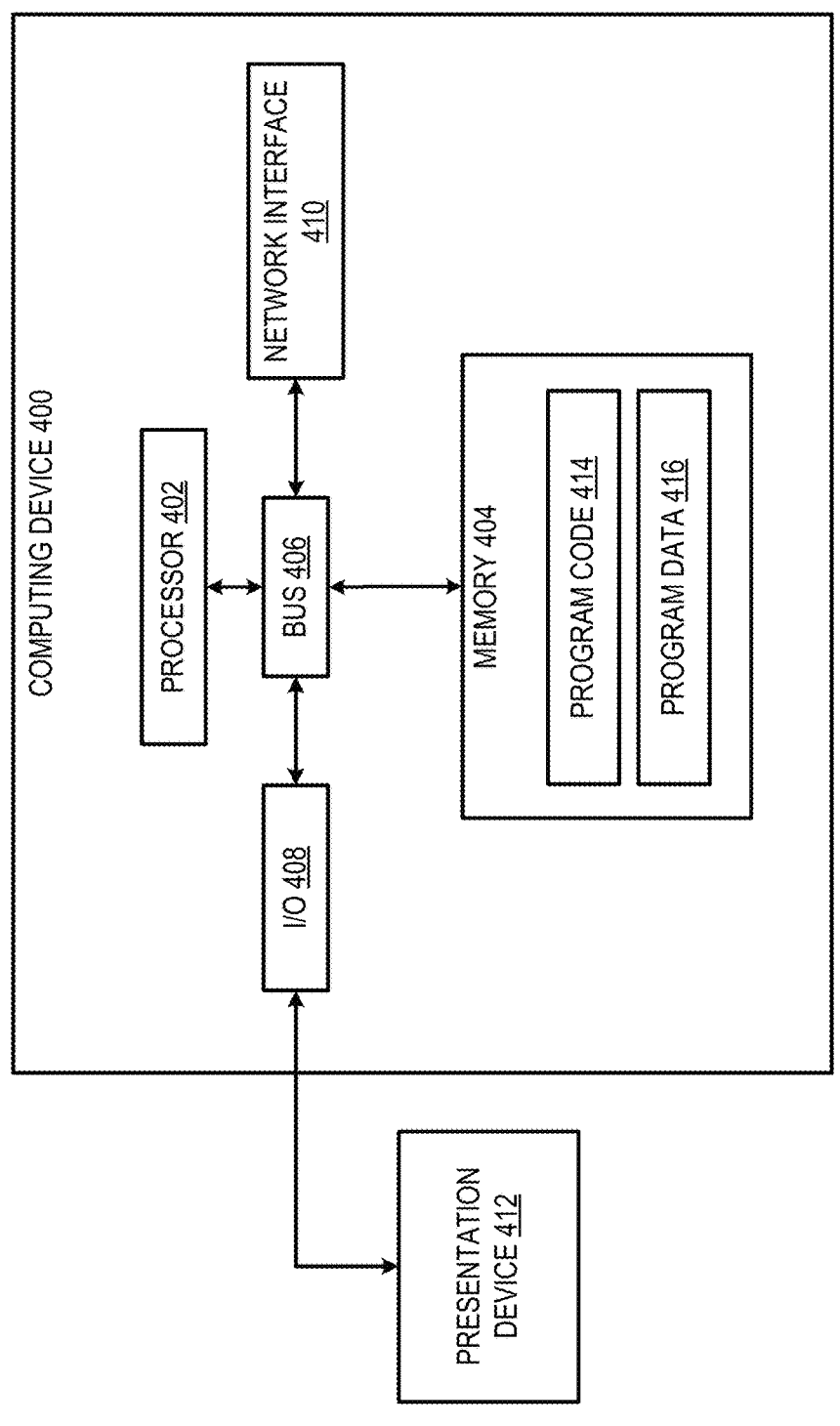
FIG. 4 is a block diagram depicting an example of a computing device, which can be used to implement the embodiments described herein according to some aspects of the present disclosure.

Any suitable computing system or group of computing systems can be used to perform the operations for the techniques described herein. For example, FIG. 4 is a block diagram depicting an example of a computing device 400, which can be used to implement the risk assessment server 104. The computing device 400 can include various devices for communicating with other devices in the computing environment 100, as described with respect to FIG. 1. The computing device 400 can include various devices for performing one or more operations, such as risk assessment operations, described above with respect to FIGS. 1-3.

The computing device 400 can include a processor 402 that can be communicatively coupled to a memory 404. The processor 402 can execute computer-executable program code stored in the memory 404, can access information stored in the memory 404, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 402 can include a microprocessor, an application-specific integrated circuit (ASIC), a field-programmable gate array (FPGA), or any other suitable processing device. The processor 402 can include any suitable number of processing devices, including one. The processor 402 can include or communicate with a memory 504. The memory 404 can store program code that, when executed by the processor 402, causes the processor 402 to perform the operations described herein.

The memory 404 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C #, Visual Basic, Java, Python, Perl, JavaScript, ActionScript, etc.

The computing device 400 may also include a number of external or internal devices such as input or output devices. For example, the computing device 400 is illustrated with an input/output interface 408 that can receive input from input devices or provide output to output devices. A bus 406 can also be included in the computing device 400. The bus 406 can communicatively couple one or more components of the computing device 400.

The computing device 400 can execute program code 414 that can include risk assessment application 106. The program code 414 for the risk assessment application 106 may be resident in any suitable computer-readable medium and may be executed on any suitable processing device. For example, and as illustrated in FIG. 4, the program code 414 for the risk assessment application 106 can reside in the memory 404 at the computing device 400 along with the program data 416 associated with the program code 414. Executing the risk assessment application 106 can configure the processor 402 to perform at least a portion of the operations described herein.

In some aspects, the computing device 400 can include one or more output devices. One example of an output device can be or include the network interface device 410 illustrated in FIG. 4. A network interface device 410 can include any device or group of devices suitable for establishing a wired or wireless data connection to one or more data networks described herein. Non-limiting examples of the network interface device 410 can include an Ethernet network adapter, a modem, etc.

Another example of an output device can include the presentation device 412 depicted in FIG. 4. A presentation device 412 can include any device or group of devices suitable for providing visual, auditory, or other suitable sensory output. Non-limiting examples of the presentation device 412 can include a touchscreen, a monitor, a speaker, a separate mobile computing device, etc. In some aspects, the presentation device 412 can include a remote client-computing device that communicates with the computing device 400 using one or more data networks described herein. In other aspects, the presentation device 412 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

What is claimed is:

1. A computer-implemented method comprising:
receiving, from a requesting entity, a request to access an interactive computing environment;
accessing, by a processor, data associated with a set of entities;
for each entity of the set of entities, determining, by the processor, an attribute tier of the respective entity based on a value of an attribute of the entity, wherein the attribute tier is one of a set of attribute tiers;
for each attribute tier:
generating, by the processor, a respective model configured to predict a percent change in the attribute over a time period for each entity in the respective attribute tier,
determining, by the processor, the percent change in the attribute over the time period for each entity in the respective attribute tier using the respective model associated with the respective attribute tier,
ranking, by the processor, each entity in the attribute tier based on the predicted percent change in the attribute, and
assigning, by the processor, a score to each entity in the attribute tier based on the rank of the respective entity and on a preconfigured distribution, wherein the score is selected from a set of scores;
for each score in the set of scores:
aggregating, by the processor, entities having the respective score into a segment that can be correlated to a risk associated with the entities in that segment;
storing, by the processor in a database accessible by a remote computing system, the set of entities and associated segments;
responsive to the request, accessing a segment associated with the requesting entity to determine whether to deny the request; and
based at least in part on a risk value assigned to the segment, denying the request to access the interactive computing environment.

2. The method of claim 1, the method further comprising:
receiving, by the processor from the remote computing device, a request for a risk indicator associated with a target entity;
determining, by the processor, the risk indicator based on the segment of the target entity; and
transmitting, to the remote computing device, a responsive message comprising at least the risk indicator for use in controlling access of the target entity to one or more interactive computing environments.

3. The method of claim 1, wherein generating the model for each attribute tier comprises:
determining, by the processor, a degree of correlation between each variable of a set of variables and the attribute associated with the respective attribute tier;
selecting, by the processor, a subset of variables having a degree of correlation above a correlation threshold; and generating, by the processor, the model for the respective attribute tier by fitting a linear regression model to entity data associated with the subset of variables.

4. The method of claim 1, the method further comprising:
generating, by the processor, disambiguated data by aggregating data associated with each entity into a micro-group, wherein the micro-group represents seven or more entities.

5. The method of claim 1, wherein the segment is one of a set of segments and wherein the segment is associated with a number of entities such that a percentage of the set of entities are assigned to the segment.

6. The method of claim 5, wherein the percentage of the set of entities assigned to the segment is determined based on a Gaussian distribution.

7. The method of claim 1, wherein the preconfigured distribution is based on an observed distribution associated with a population containing the set of entities.

8. A system comprising:
a processor, and
a non-transitory computer-readable medium comprising instructions that are executable by the processor for causing the processor to perform operations comprising:
receiving, from a requesting entity, a request to access an interactive computing environment;
accessing, by the processor, data associated with a set of entities;
for each entity of the set of entities, determining an attribute tier of the respective entity based on a value of an attribute of the entity, wherein the attribute tier is one of a set of attribute tiers;
for each attribute tier:
generating a respective model configured to predict a percent change in the attribute over a time period for each entity in the respective attribute tier,
determining the percent change in the attribute over the time period for each entity in the respective attribute tier using the respective model associated with the respective attribute tier,
ranking each entity in the attribute tier based on the predicted percent change in the attribute, and
assigning a score to each entity in the attribute tier based on the rank of the respective entity and on a preconfigured distribution, wherein the score is selected from a set of scores;
for each score in the set of scores:
aggregating entities having the respective score into a segment that can be correlated to a risk associated with the entities in that segment;
storing, in a database accessible by a remote computing system, the set of entities and associated segments;
responsive to the request, accessing a segment associated with the requesting entity to determine whether to deny the request; and
based at least in part on a risk value assigned to the segment, denying the request to access the interactive computing environment.

9. The system of claim 8, wherein the operations further comprise:
receiving a request for a risk indicator associated with a target entity;
determining the risk indicator based on the segment of the target entity; and
transmitting, to the remote computing device, a responsive message comprising at least the risk indicator for use in controlling access of the target entity to one or more interactive computing environments.

10. The system of claim 8, wherein generating the model for each attribute tier comprises:

determining a degree of correlation between each variable of a set of variables and the attribute associated with the respective attribute tier;

selecting a subset of variables having a degree of correlation above a correlation threshold; and generating the model for the respective attribute tier by fitting a linear regression model to entity data associated with the subset of variables.

11. The system of claim 8, wherein the operations further comprise:

generating disambiguated data by aggregating data associated with each entity into a micro-group, wherein the micro-group represents seven or more entities.

12. The system of claim 11, wherein the micro-group is generated based on a geographic proximity of the seven or more entities.

13. The system of claim 8, wherein the segment is one of a set of segments and wherein the segment is associated with a number of entities such that a percentage of the set of entities are assigned to the segment.

14. The system of claim 13, wherein the percentage of the set of entities assigned to the segment is determined based on a Gaussian distribution.

15. The system of claim 8, wherein the preconfigured distribution is based on an observed distribution associated with a population containing the set of entities.

16. A non-transitory computer-readable storage medium having program code that is executable by a processor device to cause a computing device to perform operations, the operations comprising:

receiving, from a requesting entity, a request to access an interactive computing environment;

accessing, by the processor, data associated with a set of entities;

for each entity of the set of entities, determining an attribute tier of the respective entity based on a value of an attribute of the entity, wherein the attribute tier is one of a set of attribute tiers;

for each attribute tier:

generating a respective model configured to predict a percent change in the attribute over a time period for each entity in the respective attribute tier, determining the percent change in the attribute over the time period for each entity in the respective attribute tier using the respective model associated with the respective attribute tier, ranking each entity in the attribute tier based on the predicted percent change in the attribute, and assigning a score to each entity in the attribute tier based on the rank of the respective entity and on a preconfigured distribution, wherein the score is selected from a set of scores;

for each score in the set of scores:

aggregating entities having the respective score into a segment that can be correlated to a risk associated with the entities in that segment;

storing, in a database accessible by a remote computing system, the set of entities and associated segments;

responsive to the request, accessing a segment associated with the requesting entity to determine whether to deny the request; and based at least in part on a risk value assigned to the segment, denying the request to access the interactive computing environment.

17. The non-transitory computer-readable storage medium of claim 16, wherein the operations further comprise:

receiving a request for a risk indicator associated with a target entity;

determining the risk indicator based on the segment of the target entity; and transmitting, to the remote computing device, a responsive message comprising at least the risk indicator for use in controlling access of the target entity to one or more interactive computing environments.

18. The non-transitory computer-readable storage medium of claim 16, wherein generating the model for each attribute tier comprises:

determining a degree of correlation between each variable of a set of variables and the attribute associated with the respective attribute tier;

selecting a subset of variables having a degree of correlation above a correlation threshold; and generating the model for the respective attribute tier by fitting a linear regression model to entity data associated with the subset of variables.

19. The non-transitory computer-readable storage medium of claim 16, wherein the operations further comprise:

generating disambiguated data by aggregating data associated with each entity into a micro-group, wherein the micro-group represents seven or more entities.

20. The non-transitory computer-readable storage medium of claim 16, wherein the segment is one of a set of segments and wherein the segment is associated with a number of entities such that a percentage of the set of entities are assigned to the segment.

* * * * *